US012759616B2

(12) United States Patent
Lee

(10) Patent No.: US 12,759,616 B2
(45) Date of Patent: Oct. 13, 2026

(54) STEERING RACK AND METHOD OF MANUFACTURING THE SAME

(71) Applicant: HL MANDO CORPORATION, Gyeonggi-do (KR)

(72) Inventor: Donghyeon Lee, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 553 days.

(21) Appl. No.: 18/207,678

(22) Filed: Jun. 9, 2023

(65) Prior Publication Data

US 2023/0399045 A1 Dec. 14, 2023

(30) Foreign Application Priority Data

Jun. 9, 2022 (KR) ........................ 10-2022-0070169

(51) Int. Cl.
*B62D 5/04* (2006.01)

(52) U.S. Cl.
CPC ......... *B62D 5/0421* (2013.01); *B62D 5/0448* (2013.01)

(58) Field of Classification Search
CPC ........ B62D 3/126; B62D 3/08; B62D 5/0421; B62D 5/0448
See application file for complete search history.

(56) References Cited

U.S. PATENT DOCUMENTS 4,619,155 A * 10/1986 Futaba ................... B62D 3/123 180/428
5,337,627 A * 8/1994 Nakamura .......... F16H 25/2204 74/424.76
8,708,357 B2 * 4/2014 Sumihara ................. B62D 5/22 74/498

(Continued)

FOREIGN PATENT DOCUMENTS

DE 10310505 A1 * 9/2004 ........... B62D 5/0424
GB 790962 A * 2/1958 ............... B62D 3/08

(Continued)

OTHER PUBLICATIONS

Budaker et al., Servo steering system for automobile has 2 parallel belt drives between electric motor shaft and intermediate drive for reducing noise emission level, Sep. 23, 2004, EPO, DE 103 10 505 A1, Machine Translation of Description (Year: 2004).*

(Continued)

*Primary Examiner* — James A English
(74) *Attorney, Agent, or Firm* — WOMBLE BOND DICKINSON (US) LLP

(57) ABSTRACT

Disclosed herein are a steering rack and a method of manufacturing the same. The steering rack includes a body part having both ends, each of which is connectable to a respective wheel and extending in a width direction of a vehicle body, and a threaded part provided on one side of the body part and having screw gear teeth configured to be engageable with a ball nut configured to be rotatable by (Continued)

power of a motor by means of a ball. The screw gear teeth may be divided into a first area relatively adjacent to a center of the threaded part and a second area relatively adjacent to both ends of the threaded part, and an over ball diameter of the first area is different from an over ball diameter of the second area.

5 Claims, 11 Drawing Sheets

(56) References Cited

U.S. PATENT DOCUMENTS

| | | | | |
|---|---|---|---|---|
| 2014/0144263 | A1* | 5/2014 | Yoshioka | B62D 5/0448 74/424.81 |
| 2014/0174222 | A1* | 6/2014 | Kiforiuk | B62D 5/0448 74/89.23 |
| 2017/0021857 | A1* | 1/2017 | Bae | B62D 5/0448 |

FOREIGN PATENT DOCUMENTS

| | | |
|---|---|---|
| JP | 2005-14835 | 1/2005 |
| JP | 2005-121042 | 5/2005 |
| JP | 2014-105802 | 6/2014 |
| JP | 2016-166675 | 9/2016 |
| KR | 10-2005-0040203 | 5/2005 |
| KR | 10-2017-0010522 | 2/2017 |

OTHER PUBLICATIONS

Office Action dated Mar. 28, 2024 for Korean Patent Application No. 10-2022-0070169 and its English translation provided by the Applicant's foreign counsel.

* cited by examiner

STEERING RACK AND METHOD OF MANUFACTURING THE SAME

CROSS-REFERENCE TO RELATED APPLICATION

This application claims the benefit of Korean Patent Application No. 10-2022-0070169, filed on Jun. 9, 2022 in the Korean Intellectual Property Office, the disclosure of which is incorporated herein by reference for all purposes as if fully set forth herein.

BACKGROUND

1. Technical Field

Embodiments of the present disclosure generally relate a steering rack and a method of manufacturing the same, and more particularly, to a steering rack having an improved steering sensitivity for a driver and improved driving stability of a vehicle, and a method of manufacturing the same.

2. Description of the Related Art

In general, power-assisted steering devices are applied to vehicles to assist the steering power of drivers who operate steering wheels. Examples of the power-assisted steering device include a hydraulic power steering (HPS) that assists a steering power using a hydraulic pressure generated by a pump and a motor driven power steering (MDPS) that assists a steering power using rotational power of a motor.

Among them, in the MDPS, an electronic controller drives the motor on the basis of driving conditions of a vehicle, which are detected by a torque sensor and a vehicle speed sensor of a steering wheel, and thus assists a steering power for steering the vehicle. The MDPS may provide a light and comfortable steering sensitivity when the vehicle is driving at a low speed and may provide excellent vehicle steering ability in addition to a stable steering sensitivity when the vehicle is driving at a high speed. Further, the MDPS assists in quickly restoring a rotated steering wheel, thereby providing the driver with convenient steering conditions even in any operation condition of the vehicle.

Generally, the MDPS includes a motor configured to provide power and a gear assembly configured to transfer a rotational force generated from the motor to a column connected to the steering wheel or a rack bar connected to a wheel side, and may be classified into various types according to installation positions of the motor and the gear assembly. As an example, the MDPS device may be classified into a column-assist type electronic power steering (C-EPS) in which a motor is mounted on a column, a pinion-assist type electronic power steering (P-EPS) in which a motor is mounted in a pinion gear engaged with a rack bar, a rack-assist type electronic power steering (R-EPS) in which a motor is mounted on a rack bar, and the like. Furthermore, in recent years, steer by wire (SbW) type steering systems have been developed which receive the steering will of the driver using an electrical signal without a mechanical connection between a steering wheel and vehicle wheels and steers the vehicle wheels by operating a motor on the basis of the signal.

However, a steering sensitivity felt by the driver, particularly, a reaction force felt from the steering wheel when the driver performs steering, according to a steering state of the wheel or a driving speed of the vehicle, frequently fluctuates according to a steering angle, and thus an operation sense for the driver may be degraded. In addition, a problem that the vehicle pulls to one side regardless of the steering will of the driver when the vehicle drives at a high speed has been continuously raised.

Thus, a method is required in which a constant and stable steering sensitivity can be provided to the driver, and at the same time, driving stability of the vehicle can be achieved.

RELATED ART DOCUMENT

Patent Document

Korean Patent Application Publication No. 10-2005-0040203 (published on May 3, 2005)

SUMMARY

It is an aspect of the present disclosure to provide a steering rack, which can provide a stable steering sensitivity to a driver, and a method of manufacturing the same.

It is another aspect of the present disclosure to provide a steering rack having improved driving stability and improved high-speed stability of a vehicle, and a method of manufacturing the same.

It is still another aspect of the present disclosure to provide a steering rack through which the driver can receive a constant reaction force or a constant weight sensitivity of a steering wheel, which is felt during steering, and a method of manufacturing the same.

It is yet another aspect of the present disclosure to provide a steering rack, which can provide a uniform steering sensitivity to a driver regardless of a steering state of a vehicle wheel or a driving speed of a vehicle, and a method of manufacturing the same.

It is yet another aspect of the present disclosure to provide a steering rack, which can improve efficiency and productivity of a manufacturing process through a simple structure, and a method of manufacturing the same.

It is yet another aspect of the present disclosure to provide a steering rack, which can promote product competitiveness by suppressing an increase in a manufacturing cost, and a method of manufacturing the same.

Additional aspects of the disclosure will be set forth in part in the description which follows and, in part, will be obvious from the description, or may be learned by practice of the disclosure.

In accordance with one aspect of the present disclosure, a steering rack includes a body part having both ends, each of which is connected to a wheel and extending in a width direction of a vehicle body, and a threaded part provided on one side of the body part and having screw gear teeth engaged with a ball nut rotating by power of a motor by means of a ball, wherein the screw gear teeth are divided into a first area relatively adjacent to a center of the threaded part and a second area relatively adjacent to both ends of the threaded part, and an over ball diameter of the first area is different from an over ball diameter of the second area.

The over ball diameter of the first area may be relatively greater than the over ball diameter of the second area.

In accordance with another aspect of the present disclosure, a steering rack includes a body part having both ends, each of which is connected to a wheel and extending in a width direction of a vehicle body, and a threaded part provided on one side of the body part and having screw gear teeth engaged with a ball nut rotating by power of a motor by means of a ball, wherein an over ball diameter of the screw gear teeth is gradually changed from both ends toward a center of the threaded part.

The over ball diameter of the screw gear teeth may gradually increase from both ends toward the center of the threaded part.

In accordance with still another aspect of the present disclosure, a steering rack includes a body part having both ends, each of which is connected to a wheel and extending in a width direction of a vehicle body, and a threaded part provided on one side of the body part and having screw gear teeth engaged with a ball nut rotating by power of a motor by means of a ball, wherein the screw gear teeth are divided into a first area relatively adjacent to a center of the threaded part and a second area relatively adjacent to both ends of the threaded part, and a thread groove curvature radius of the first area is different from a thread groove curvature radius of the second area.

The thread groove curvature radius of the first area may be relatively greater than the thread groove curvature radius of the second area.

In accordance with yet another aspect of the present disclosure, a steering rack includes a body part having both ends, each of which is connected to a wheel and extending in a width direction of a vehicle body, and a threaded part provided on one side of the body part and having screw gear teeth engaged with a ball nut rotating by power of a motor by means of a ball, wherein a thread groove curvature radius of the screw gear teeth is gradually changed from both ends toward a center of the threaded part.

The thread groove curvature radius of the screw gear teeth may gradually increase from both ends toward the center of the threaded part.

In accordance with yet another aspect of the present disclosure, a steering rack includes a body part having both ends, each of which is connected to a wheel and extending in a width direction of a vehicle body, and a threaded part provided on one side of the body part and having screw gear teeth engaged with a ball nut rotating by power of a motor by means of a ball, wherein the screw gear teeth are divided into a first area relatively adjacent to a center of the threaded part and a second area relatively adjacent to both ends of the threaded part, and a backlash of the first area is different from a backlash of the second area.

The backlash of the first area may be relatively smaller than the backlash of the second area.

In accordance with yet another aspect of the present disclosure, a steering rack includes a body part having both ends, each of which is connected to a wheel and extending in a width direction of a vehicle body, and a threaded part provided on one side of the body part and having screw gear teeth engaged with a ball nut rotating by power of a motor by means of a ball, wherein a backlash of the screw gear teeth is gradually changed from both ends toward a center of the threaded part.

The backlash of the screw gear teeth may gradually decrease from both ends toward the center of the threaded part.

In accordance with yet another aspect of the present disclosure, a method of manufacturing a steering rack includes preparing a body part having both ends, each of which is connected to a wheel, and forming a threaded part on one side of the body part, wherein the forming of the threaded part includes forming screw gear teeth engaged with a ball nut rotating by power of a motor, the forming of the screw gear teeth includes processing a first area relatively adjacent to a center of the threaded part, and processing a second area relatively adjacent to both ends of the threaded part, and a processing depth of the first area on an outer circumferential surface of the body part is different from a processing depth of the second area on the outer circumferential surface of the body part.

The processing of the first area may include cutting a grinding stone in a first processing depth inwards, and the processing of the second area includes cutting the grinding stone in a second processing depth, which is different from the first processing depth, inwards.

The first processing depth may be relatively smaller than the second processing depth.

In accordance with yet another aspect of the present disclosure, a method of manufacturing a steering rack includes preparing a body part having both ends, each of which is connected to a wheel, and forming a threaded part on one side of the body part, wherein the forming of the threaded part may include forming screw gear teeth engaged with a ball nut rotating by power of a motor, and in the forming of the screw gear teeth, a processing depth on an outer circumferential surface of the body part may be gradually changed from both ends toward a center of the threaded part.

In the forming of the screw gear teeth, a cutting length of a grinding stone may be gradually changed from both ends toward the center of the threaded part.

In the forming of the screw gear teeth, a cutting length of a grinding stone may gradually decrease from both ends toward the center of the threaded part.

In the forming of the screw gear teeth, the screw gear teeth may be formed by applying a plurality of grinding stones having different radii, but the radius of the grinding stone may be gradually changed from both ends toward the center of the threaded part.

In the forming of the screw gear teeth, a radius of the grinding stone may gradually increase from both ends toward the center of the threaded part.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
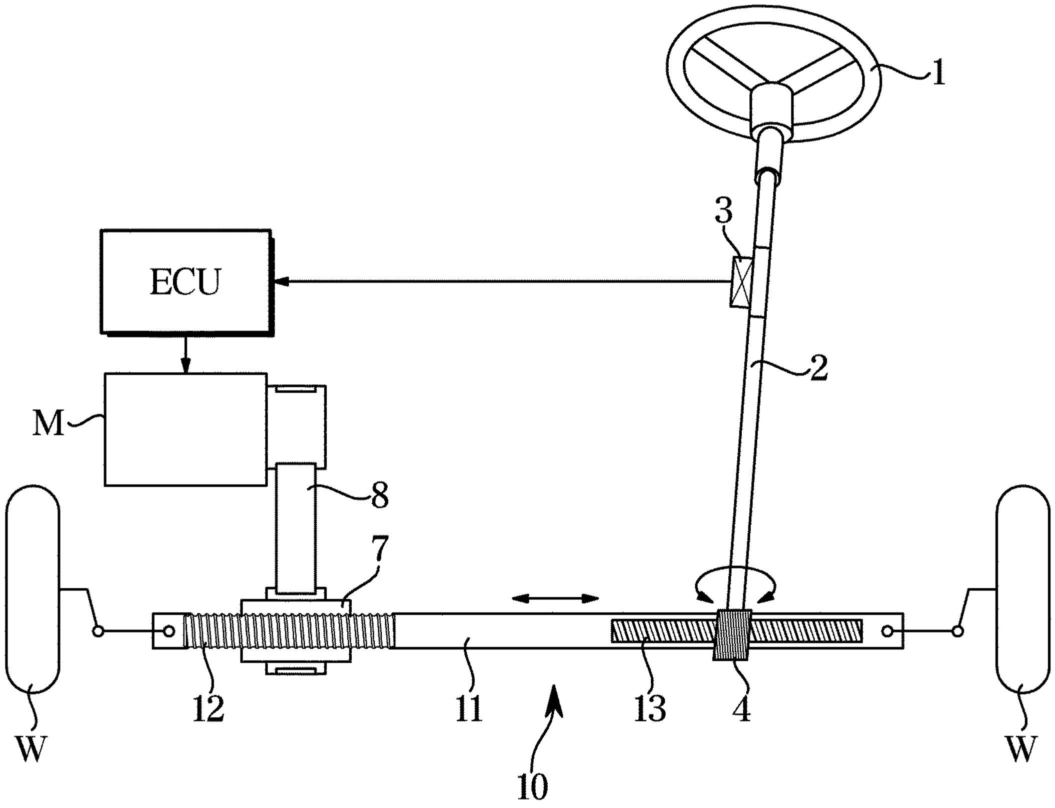
FIG. 1 is a schematic view for illustrating a steering system of a vehicle.

Hereinafter, embodiments of the present disclosure will be described in detail with reference to the accompanying drawings. The following embodiments are presented to sufficiently transfer the spirit of the present disclosure to those skilled in the art to which the present disclosure pertains. The present disclosure is not limited to the embodiments presented herein and may be embodied in other forms. In the drawings, illustration of components irrelevant to the description will be omitted to clarify the present disclosure, and the sizes of the components may be slightly exaggerated to help understanding.

FIG. 1 is a schematic diagram for illustrating a steering system of a vehicle.

Referring to FIG. 1, in a rack-assist type electronic power steering (R-EPS), a column 2 is connected to a steering wheel 1 that is gripped and operated by a driver.

A pinion 4 is connected to the column 2, and gear teeth of the pinion 4 engages a threaded part 13 of the rack bar 10. An electronic control unit ECU determines a steering angle of the steering wheel 1 operated by the driver through a torque sensor 3 mounted on the column 2. The electronic control unit ECU controls to generate power by operating and controlling a driving device such as a motor M on the basis of the steering angle detected by the torque sensor 3, and the power generated by the driving device is reduced and transferred to a threaded part 12 provided in a rack bar 11 of a steering rack 10 via a gear and/or belt assembly 8. A ball nut 7 is rotated by the rotational power transferred from the driving device and the gear and/or belt assembly 8, the threaded part 12 of the rack bar 11 is provided with a screw thread engaged with the ball nut 7 by means of a ball, and accordingly, the rack bar 11 may translate in a width direction of the vehicle (e.g. a left-right direction in FIG. 1). Wheels W are connected to both ends of the rack bar 11 by a ball joint or the like, and thus the wheels W may be steered by the translation motion of the rack bar 11.

Figure 2:
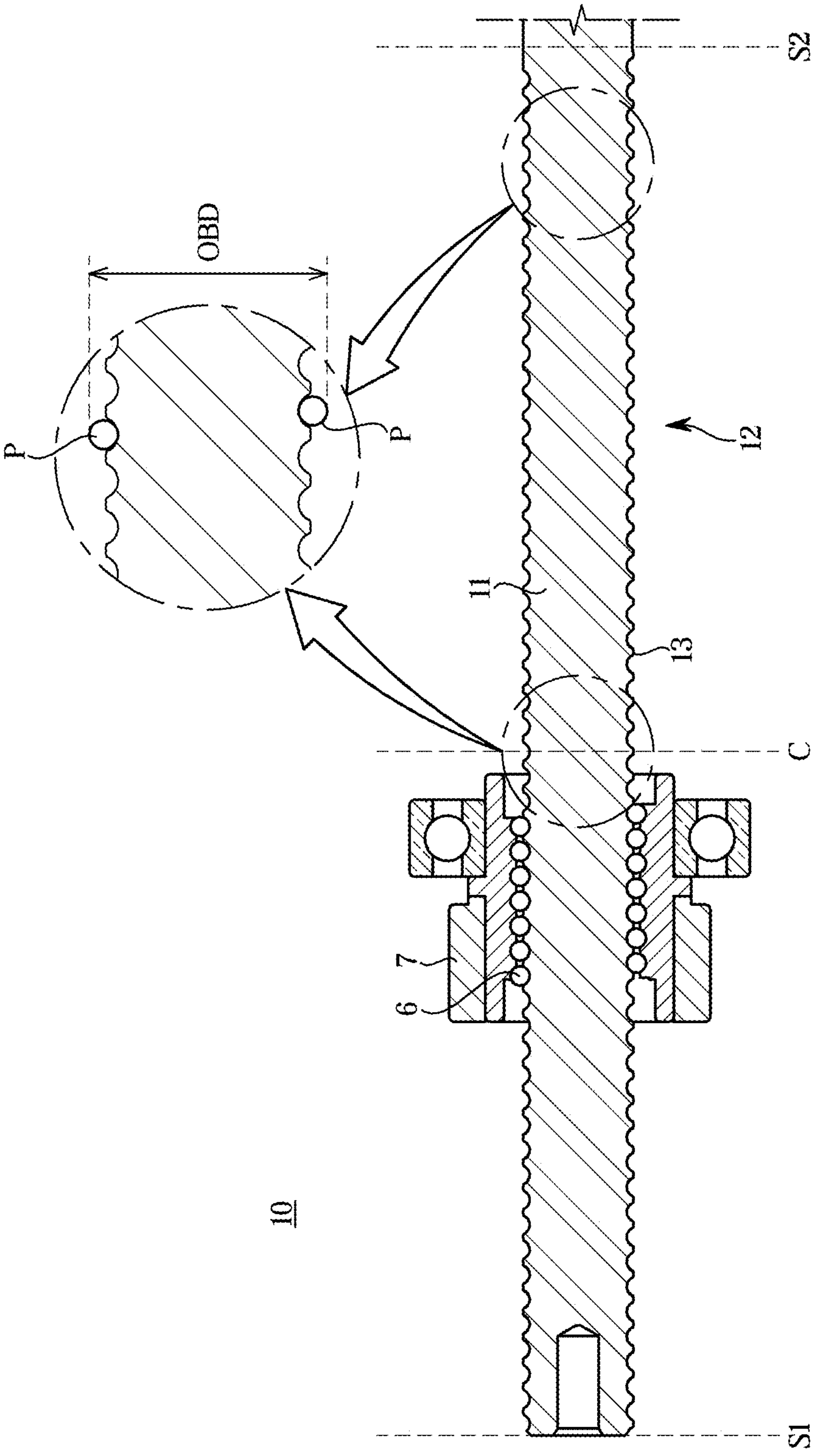
FIG. 2 is a cross-sectional view for illustrating a threaded part and a ball nut of a steering rack.
Figure 3A:
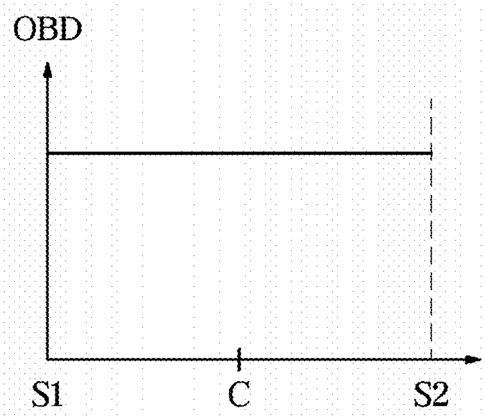
FIG. 3(*a*) is a graph for depicting an over ball diameter OBD, FIG. 3(*b*) is a graph for depicting a backlash, FIG. 3(*c*) is a graph for depicting a frictional force for a ball, and FIG. 3(*d*) is a graph for depicting a reaction force (the weight sensitivity of a steering wheel) applied to the steering wheel.
Figure 3B:
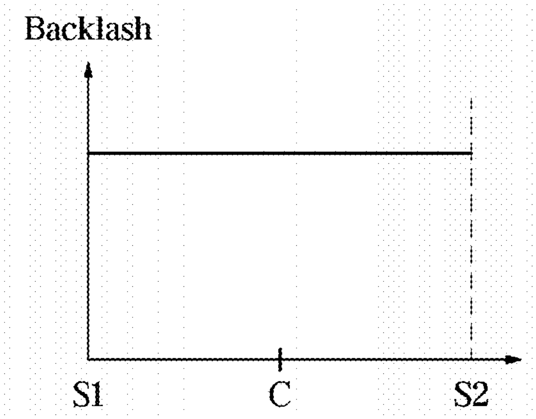
Figure 3C:
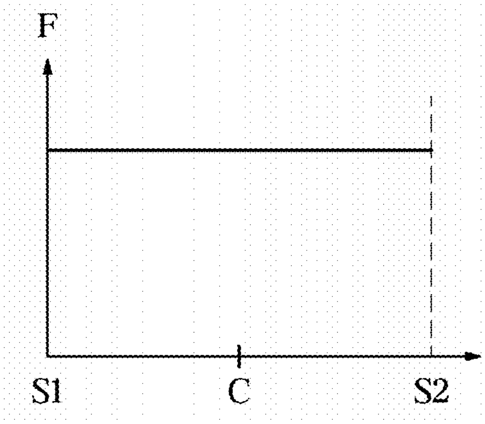
Figure 3D:
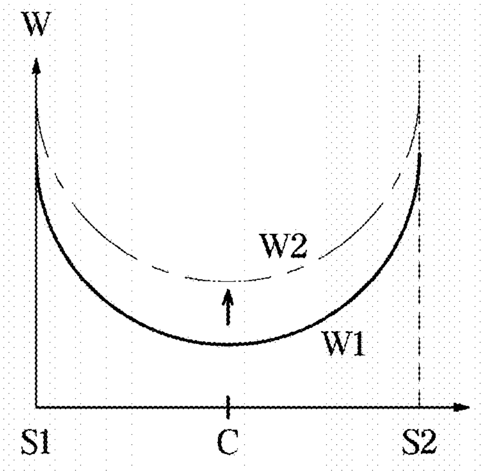

FIG. 2 is a cross-sectional view for illustrating the threaded part 12 and the ball nut 7 of the steering rack 10. FIG. 3(*a*) is a graph for depicting an over ball diameter OBD, FIG. 3(*b*) is a graph for depicting a backlash, FIG. 3(*c*) is a graph for depicting a frictional force F for a ball, and FIG. 3(*d*) is a graph for depicting a reaction force (the weight sensitivity of a steering wheel) applied to the steering wheel.

Referring to FIG. 2, screw gear teeth 13 having the same shape are formed on the rack bar 11, that is, the steering rack 10, along a longitudinal direction of the rack bar 11. In detail, the threaded part 12 provided in the steering rack 10 has the same shape and depth as that of the screw gear teeth 13 regardless of an arrangement position of the screw gear teeth 13 with respect to the longitudinal direction of the steering rack 10. Accordingly, as illustrated in FIG. 3(*a*), the over ball diameter OBD according to the position of the threaded part 12 is the same. Furthermore, as illustrated in FIGS. 3(*b*) and 3(*c*), the backlash and the frictional force F for a ball 6 according to the position of the threaded part 12 are also the same.

For reference, the over ball diameter OBD is obtained by inserting two pins or ball members P having a predetermined diameter between the screw gear teeth 13 and measuring the diameters thereof, as a method of measuring a size of the screw gear teeth 13.

However, since the wheels W are steered while in contact with the ground, the weight sensitivity or the steering sensitivity felt by the driver from the steering wheel 1 according to the steering angle of the wheel, in other words, a fixing force for the wheel W and a reaction force transferred from the wheel W to the steering wheel 1 according to the steering angle of the wheel W, cannot help but change. In particular, a suspension device configured to damp an impact and vibration applied to the wheel W from the ground in addition to the steering system is installed in the wheel W in a complicated and multi-stage manner. Accordingly, when the wheels W are arranged in a front-rear direction of a vehicle body, a reaction force W1 transferred from the wheels W to the steering wheel 1 may be small, and thus the weight sensitivity W1 of the steering wheel 1, which is transferred to the driver, may be the smallest. However, as the steering angles of the wheels W increase, the reaction force W1 transferred from the wheels W to the steering wheel 1 may increase, and thus the weight sensitivity W1 of the steering wheel 1, which is felt by the driver, increases rapidly. In this case, the weight sensitivity W1 of the steering wheel 1 changes according to the steering angle of the wheels W, and thus the driver may feel an uncomfortable steering sensitivity. Furthermore, when the wheels W are arranged in the front-rear direction so that the driver drives the vehicle in a straight line, the fixing force for the wheels W and the reaction force W1 of the steering wheel 1 may be small. Thus, as the wheels W are not stably arranged and move slightly, the vehicle body may veer to one side.

Further, as illustrated in FIG. 3(*d*), in order to prevent the vehicle body from veering while the vehicle is driving straight, particularly, the vehicle is driving straight at a high speed, when the wheels W are arranged in the front-rear direction, and when the fixing force for the wheels W and the weight sensitivity W2 (reaction force) of the steering wheel 1 increase, as the steering angle of the wheel W increases, the corresponding fixing force and the corresponding reaction force W2 also increase rapidly, and thus operational fatigue of the driver increases, and rapid movement of the vehicle is impeded.

Accordingly, a steering rack 100 according to an embodiment of the present disclosure can provide a constant and stable steering sensitivity to the driver regardless of the steering angle of the wheel W, and at the same time, may be provided to improve driving stability of the vehicle.

Figure 4:
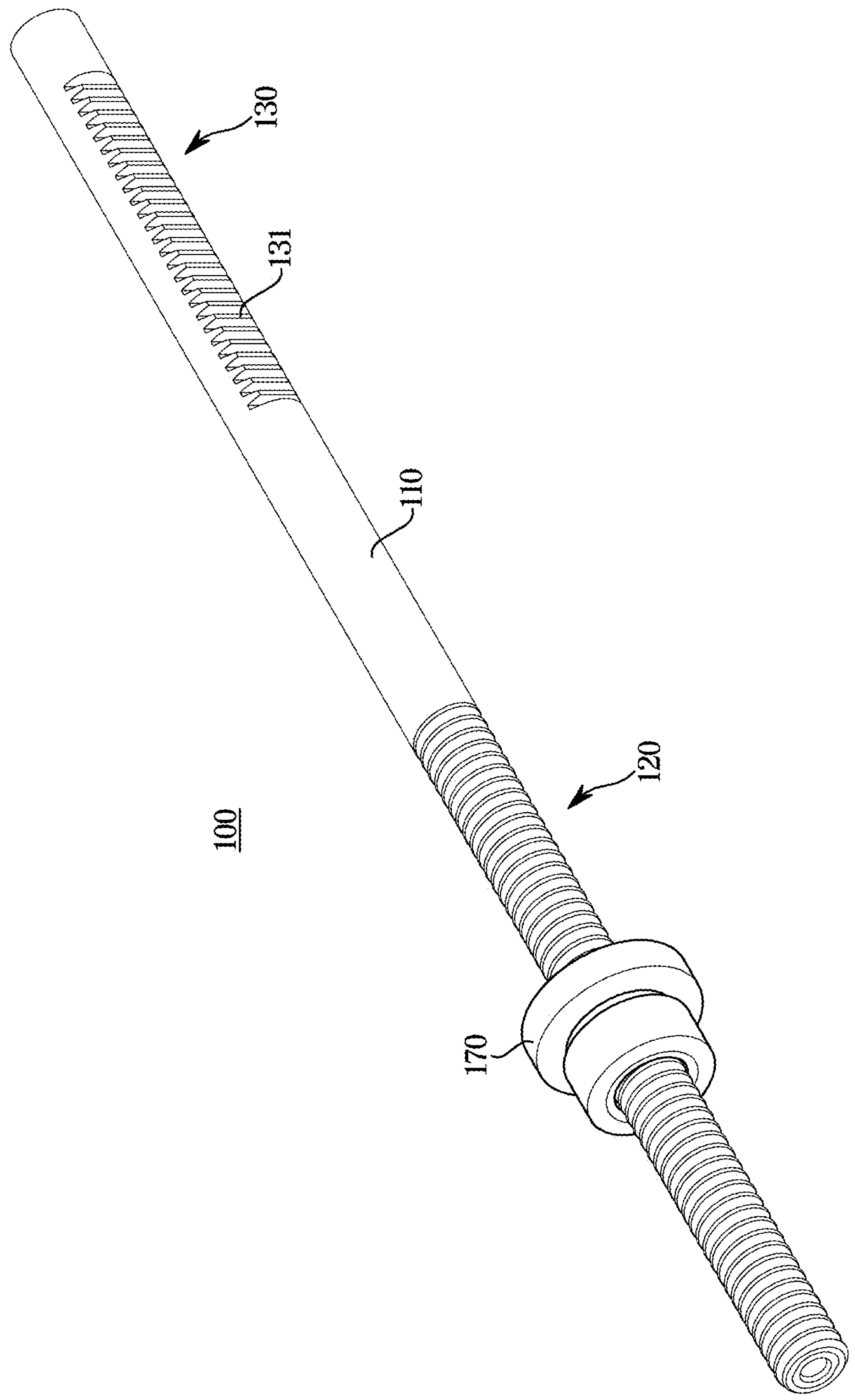
FIG. 4 is a perspective view for illustrating a steering rack according to an embodiment of the present disclosure.
Figure 5:
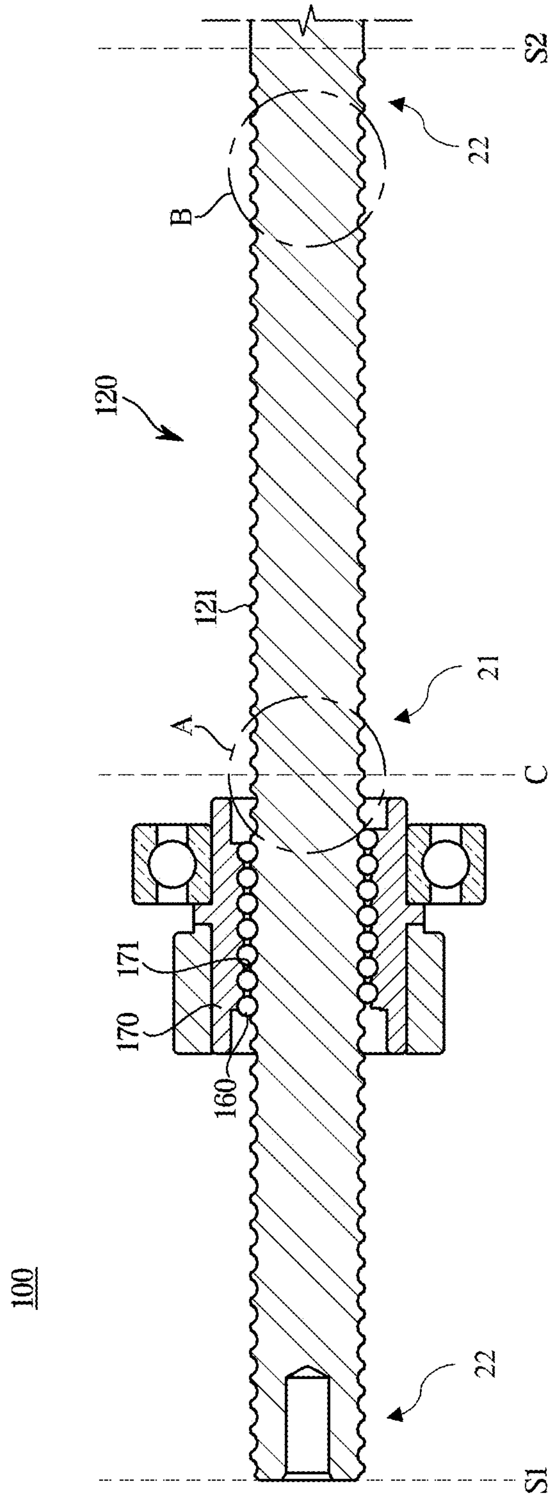
FIG. 5 is a cross-sectional view for illustrating a threaded part and a ball nut of a steering rack according to an embodiment of the present disclosure.

FIG. 4 is a perspective view for illustrating the steering rack 100 according to an embodiment of the present disclosure, and FIG. 5 is a cross-sectional view for illustrating a threaded part 120 and a ball nut 170 of the steering rack 100 according to an embodiment of the present disclosure.

Referring to FIGS. 4 and 5, the steering rack 100 according to an embodiment of the present disclosure may include a body part 110 extending in a bar shape in the width direction of the vehicle, a threaded part 120 provided on one side of the body part 110 and configured to receive power from a driving device such as a motor M of FIG. 1, and a rack gear part 130 provided on the other side of the body part 110 and connected to a steering wheel by means of a column (e.g. the steering wheel 1 by means of the column 2 in FIG. 1).

Both ends of the body part 110 may be respectively connected to a pair of wheels W by means of ball joints, and in the rack gear part 130, rack gear teeth 131 may be formed on a part of an outer circumferential surface of the body part 110 in the longitudinal direction. The rack gear teeth 131 are engageable with pinion gear teeth (e.g. gear teeth of the pinion 4 in FIG. 1) formed at an end of the column (for example, the column 2 in FIG. 1), and the body part 110 provided with the rack gear teeth 131 may translate in the width direction of the vehicle by rotation of the column and the pinion gear teeth.

The motor (e.g. the motor M in FIG. 1) may receive power from a power supply device such as a battery of the vehicle and generate and provide power for steering the vehicle, and the motor may receive an operational signal from an electronic control unit (for example, ECU in FIG. 1) so that an operation of the motor may be controlled. The electronic control unit may detect and determine the steering angle of the steering wheel from the torque sensor (such as the torque sensor 3 in FIG. 1) mounted on the column, and may operate the motor on the basis of the steering angle to generate power for the steering. The power generated and provided from the motor is transferred to the threaded part 120 through a gear and/or belt assembly (for instance, the gear and/or belt assembly 7 in FIG. 1) having one or a plurality of gears and/or a belt and pulley mechanism. For instance, the gear and/or belt assembly may include a reduction gear configured to reduce and transfer the power, and the ball nut 170 configured to be rotatable by the power reduced through the reduction gear, and nut gear teeth 171 may be formed on an inner circumferential surface of the ball nut 170.

The threaded part 120 configured to receive the power provided from the motor is provided on one side of an outer circumferential surface of the body part 110. In the threaded part 120, screw gear teeth 121 may be formed on the outer circumferential surface of the body part 110 in the longitudinal direction, and the screw gear teeth 121 may be engaged with the ball nut 170 by means of balls 160 and thus may be operated by receiving the power from the motor through the gear and/or belt assembly. As the motor actuates and the ball nut 170 rotates and in one direction, the steering rack 100 provided with the threaded part 120 may translate to one side, and in contrast, as the motor actuates and the ball nut 170 rotate in the other direction, the steering rack 100 provided with the threaded part 120 may translate to the other side, so that the wheels can be steered.

In the threaded part 120 according to an embodiment of the present disclosure, even while the driver feels a constant steering wheel weight sensitivity regardless of the steering angle of the wheels, that is, the driver feels a constant steering sensitivity regardless of the steering angle of the steering wheel or wheels, driving safety and experience of the vehicle can be improved.

The threaded part 120 according to a first embodiment of the present disclosure may have a different over ball diameter OBD of the screw gear teeth 121 according to a position thereof. For reference, the over ball diameter OBD may be obtained by inserting two pins or ball members P having a predetermined diameter between the screw gear teeth 121 and measuring the diameters thereof, as a method of measuring a size of the screw gear teeth 121.

Figure 6:
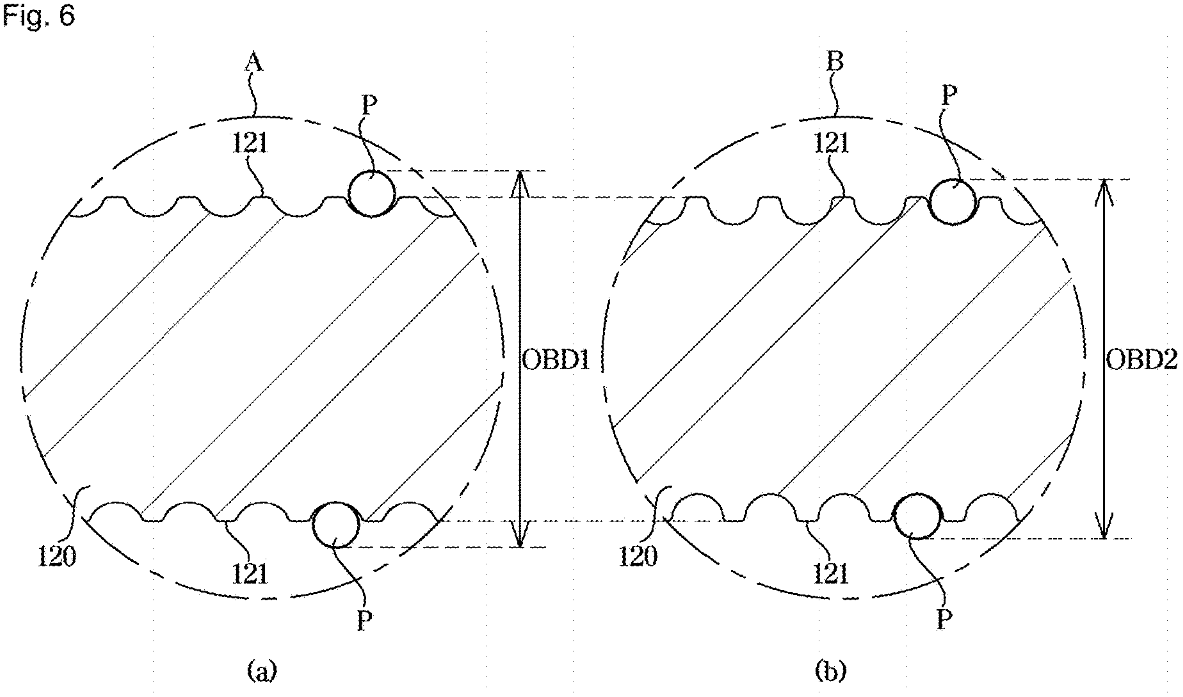
FIG. 6 is a partially enlarged view of parts A and B of FIG. 5 according to a first embodiment of the present disclosure.

FIG. 6 is a partially enlarged view of parts A and B of FIG. 5 according to a first embodiment of the present disclosure. Specifically, FIG. 6(*a*) is an enlarged view of part A of FIG. 5 according to the first embodiment of the present disclosure, and FIG. 6(*b*) is an enlarged view of part B of FIG. 5 according to the first embodiment of the present disclosure. Further, FIG. 9(*a*) is a graph for depicting an over ball diameter OBD with respect to the position of the threaded part 120 of the steering rack 100 according to embodiments of the present disclosure, FIG. 9(*c*) is a graph for depicting a frictional force F for the ball nut 170 or the ball 160 with respect to the position of the threaded part 120 of the steering rack 100 according to embodiments of the present disclosure, and FIG. 9(*d*) is a graph depicting the weight sensitivity W (reaction force) of the steering wheel according to embodiments of the present disclosure.

Referring to FIGS. 5, 6, and 9, the threaded part 120 of the steering rack 100 according to the first embodiment of the present disclosure may be divided into a first area relatively adjacent to a center C of the threaded part 120 and a second area relatively adjacent to both ends of the threaded part 120. For example, the first area of the threaded part 120 positioned relatively adjacent to the center C of the threaded part 120 may be an area 21 shown in FIG. 5, and the second area positioned relatively adjacent to both ends of the threaded part 120 may be areas 22 shown in FIG. 5, but not limited thereto. An over ball diameter OBD1 of the first area of the threaded part 120 may be provided to be different from an over ball diameter OBD2 of the second area of the threaded part 120.

For example, the first area of the screw gear teeth 121 is disposed relatively closer to the center C of the threaded part 120 than the second area, which will be described below, with respect to a longitudinal direction of the threaded part 120 the screw gear teeth 121. In contrast, the second area of the screw gear teeth 121 is disposed relatively closer to side portions or both ends S1 and S2 of the threaded part 120 than the first area of the screw gear teeth 121 with respect to the longitudinal direction of the threaded part 120. For example, the first area of the screw gear teeth 121 may be formed around the center C of the threaded part 120, and the second area of the screw gear teeth 121 may be formed around side portions or both ends S1 and S2 of the threaded part 120. That is, the first area and the second area described in some embodiments of the present disclosure may mean relative positions between gear teeth, and specific positions or specific numbers thereof are not limited thereto.

The over ball diameter OBD1 of the screw gear teeth 121 in the first area of the threaded part 120 may be provided to be relatively greater than the over ball diameter OBD2 of the screw gear teeth 121 in the second area of the threaded part 120. That is, the over ball diameter OBD1 of the screw gear teeth 121 adjacent to or at the center C of the threaded part 120 may be provided to be greater than the over ball diameter OBD2 of the screw gear teeth 121 adjacent to or at both ends S1 and S2 of the threaded part 120. Accordingly, a frictional force F1 between the screw gear teeth 121 adjacent to or at the center C of the threaded part 120 and the ball nut 170 may be formed to be greater than a frictional force F2 between the screw gear teeth 121 adjacent to or at both ends S1 and S2 of the threaded part 120 and the ball nut 170.

Furthermore, the screw gear teeth 121 of the threaded part 120 of the steering rack 100 may be provided such that the over ball diameter OBD of the screw gear teeth 121 is gradually or progressively changed from both ends S1 and S2 to the center C of the screw gear teeth 121 with respect to the longitudinal direction of the threaded part 120 without distinction by a certain area. In detail, the over ball diameter OBD1 of the screw gear teeth 121 relatively adjacent to or at the center C is provided to be greater than the over ball diameter OBD2 of the screw gear teeth 121 relatively adjacent to or at side portions S1 and S2 so that the over ball diameter OBD may gradually or progressively increase from both ends S1 and S2 of the threaded part 120 toward the center C of the threaded part 120. Therefore, the frictional force F1 between the screw gear teeth 121 and the ball nut 170 at the center C of the threaded part 120 may be formed to be greater than the frictional force F2 between the screw gear teeth 121 and the ball nut 170 at both ends S1 and S2 of the threaded part 120, and the magnitude of the frictional force F may gradually increase toward the center C of the threaded part 120.

Accordingly, as illustrated in FIG. 9(*d*), even in a state in which the steering wheel or the wheels are steered to a left end or a right end, the weight sensitivity or steering sensitivity W of the steering wheel, which is felt by the driver, can be constant, and a state in which the wheels are arranged in the front-rear direction of the vehicle body can be stably maintained when the vehicle is driving straight.

Meanwhile, in certain embodiments of the present disclosure, the weight sensitivity or the steering sensitivity of the steering wheel can be kept constant regardless of the steering angle of the steering wheel or the wheels. However, the present disclosure is not limited thereto. For example, when the weight sensitivity of the steering wheel at a specific steering angle is biased according to an operational environment of the vehicle or an individual tendency of the driver, even when the over ball diameter OBD of the screw gear teeth 121 at the corresponding steering angle intentionally increases, this case may be equally understood as the same technical spirit.

According to the second embodiment of the present disclosure, a thread groove curvature radius D of the screw gear teeth 121 of the threaded part 120 of the steering rack 100 may be different depending on the position thereof.

Figure 7:
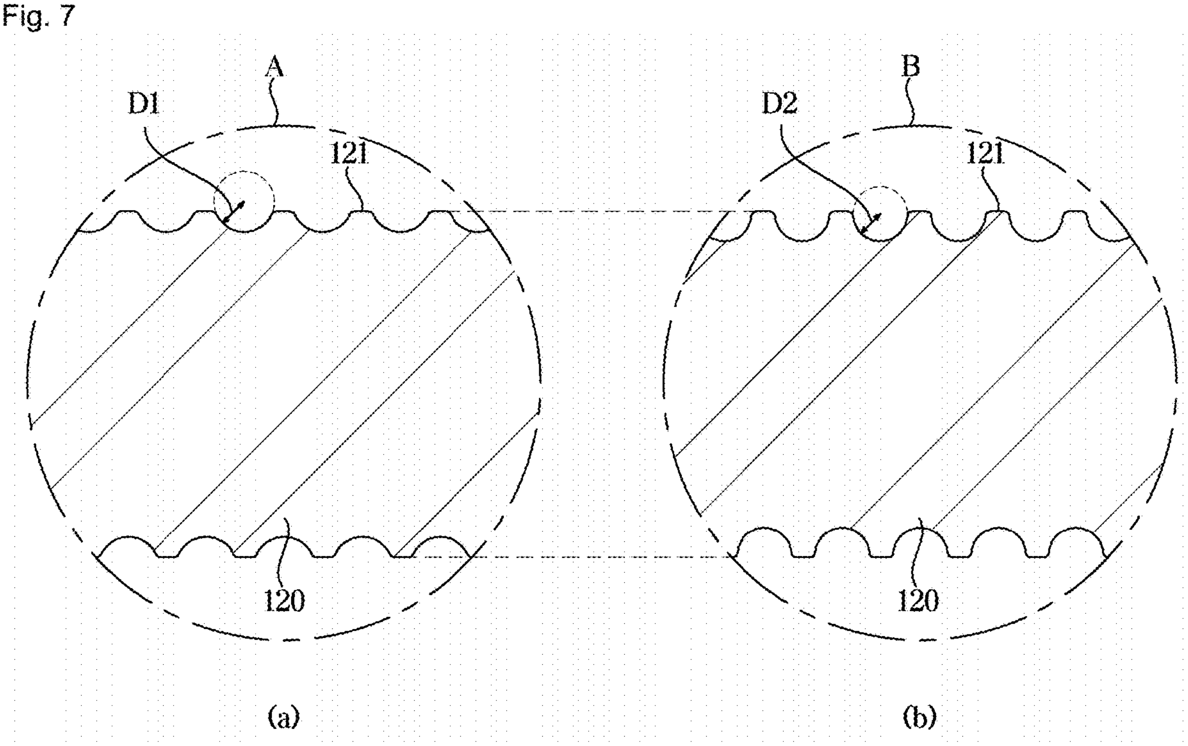
FIG. 7 is a partially enlarged view of parts A and B of FIG. 5 according to a second embodiment of the present disclosure.

FIG. 7 is a partially enlarged view of parts A and B of FIG. 5 according to a second embodiment of the present disclosure.

Referring to FIGS. 5, 7, and 9, the threaded part 120 of the steering rack 100 according to the second embodiment of the present disclosure may be divided into the first area relatively adjacent to or at the center C and the second area relatively adjacent to or at both ends S1 and S2 of the threaded part 120. A thread groove curvature radius D1 of the first area of the threaded part 120 may be provided to be different from a thread groove curvature radius D2 of the second area of the threaded part 120.

For instance, the thread groove curvature radius D1 of the screw gear teeth 121 in the first area of the threaded part 120 may be provided to be relatively greater than the thread groove curvature radius D2 of the screw gear teeth 121 in the second area of the threaded part 120. That is, the thread groove curvature radius D2 of the screw gear teeth 121 adjacent to or at the center C of the threaded part 120 may be provided to be greater than the thread groove curvature radius D1 of the screw gear teeth 121 adjacent to or at both ends S1 and S2 of the threaded part 120. Accordingly, the over ball diameter OBD1 of the screw gear teeth 121 adjacent to or at the center C of the threaded part 120 may be formed to be greater than the over ball diameter OBD2 of the screw gear teeth 121 adjacent to or at both ends S1 and S2 of the threaded part 120. Therefore, the frictional force F1 between the screw gear teeth 121 adjacent to or at the center C of the threaded part 120 and the ball nut 170 may be implemented to be greater than the frictional force F2 between the screw gear teeth 121 adjacent to or at both ends S1 and C of the threaded part 120 and the ball nut 170.

Furthermore, the screw gear teeth 121 of the threaded part 120 may be provided such that the thread groove curvature radius D of the screw gear teeth 121 is gradually or progressively changed from both ends S1 and S2 to the center C of the threaded part 120 with respect to the longitudinal direction of the threaded part 120 without distinction by a certain area. The thread groove curvature radius D1 of the screw gear teeth 121 relatively adjacent to or at the center C of the threaded part 120 is provided to be greater than the thread groove curvature radius D2 of the screw gear teeth 121 relatively adjacent to or at the side portions S1 and S2 of the threaded part 120 so that the thread groove curvature radius D may gradually or progressively increase from both ends S1 and S2 toward the center C of the threaded part 120. Therefore, the over ball diameter OBD1 of the screw gear teeth 121 adjacent to or at the center C of the threaded part 120 may gradually and progressively increase to be greater than the over ball diameter OBD2 of the screw gear teeth 121 at both ends S1 and S2 of the threaded part 120. Further, the frictional force F1 between the screw gear teeth 121 and the ball nut 170 at the center C of the threaded part 120 is formed to be greater than the frictional force F2 between the screw gear teeth 121 and the ball nut 170 at both ends of the threaded part 120, and the magnitude of the frictional force F may gradually increase toward the center C of the threaded part 120.

Accordingly, as illustrated in FIG. 9(*d*), even in a state in which the steering wheel or the wheels are steered to a left end or a right end, the weight sensitivity or steering sensitivity W of the steering wheel, which is felt by the driver, can be constant, and a state in which the wheels are arranged in the front-rear direction of the vehicle body can be stably maintained when the vehicle is driving straight.

Meanwhile, in some embodiments of the present disclosure, the weight sensitivity or the steering sensitivity of the steering wheel can be kept constant regardless of the steering angle of the steering wheel or the wheels. However, the present disclosure is not limited thereto. For instance, when the weight sensitivity of the steering wheel at a specific steering angle is biased according to an operational environment of the vehicle or an individual tendency of the driver, even when the thread groove curvature radius D of the screw gear teeth 121 at the corresponding steering angle intentionally increases, this case may be equally understood as the same technical spirit.

According to a third embodiment of the present disclosure, a backlash of the screw gear teeth 121 of the threaded part 120 may be different depending on the position thereof.

Figure 8:
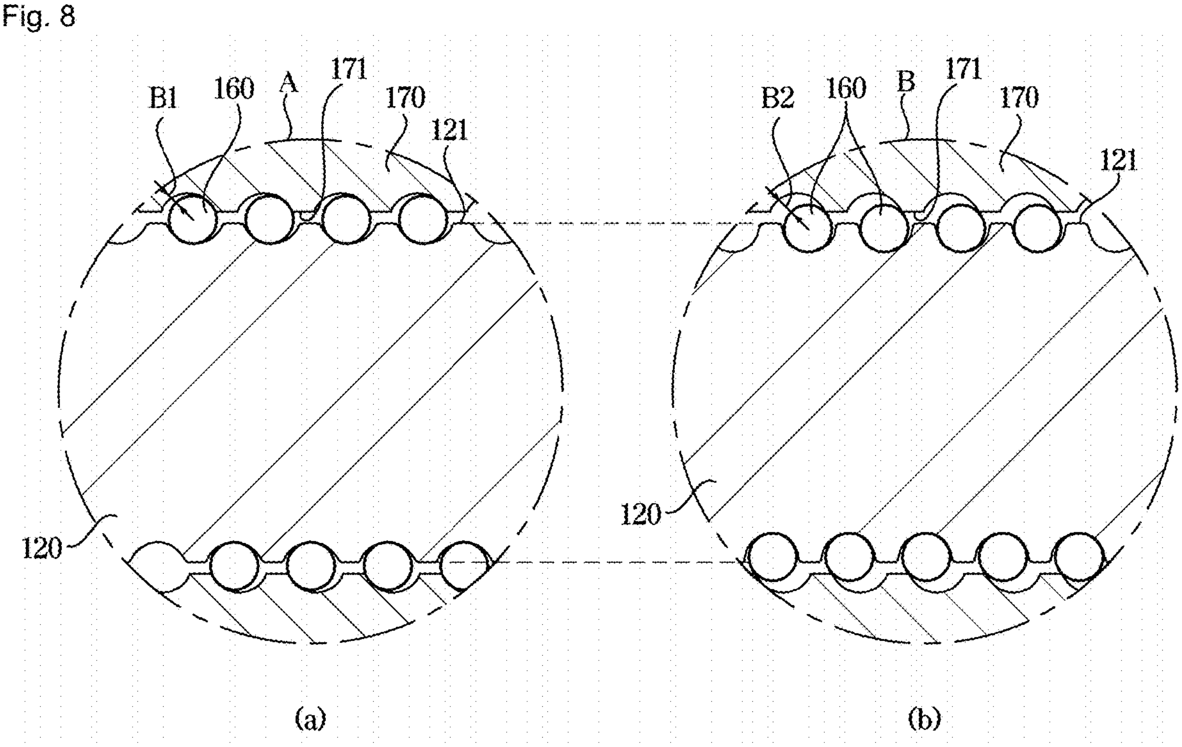
FIG. 8 is a partially enlarged view of parts A and B of FIG. 5 according to a third embodiment of the present disclosure.
Figure 9A:
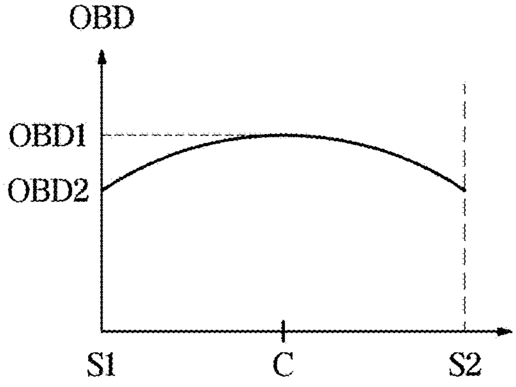
FIG. 9(*a*) is a graph for depicting an over ball diameter OBD of a steering rack with respect to a position of a threaded part according to embodiments of the present disclosure, FIG. 9(*b*) is a graph for depicting a backlash of a steering rack with respect to a position of a threaded part according to embodiments of the present disclosure, FIG. 9(*c*) is a graph for depicting a frictional force for a ball of a steering rack with respect to a position of a threaded part according to embodiments of the present disclosure, and FIG. 9(*d*) is a graph for depicting a reaction force (e.g. a weight sensitivity of a steering wheel) applied to a steering wheel with respect to a position of a threaded part according to embodiments of the present disclosure.
Figure 9B:
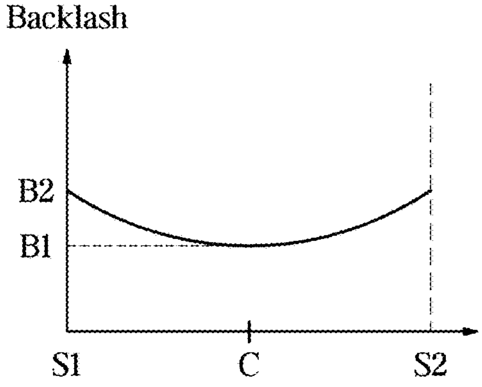
Figure 9C:
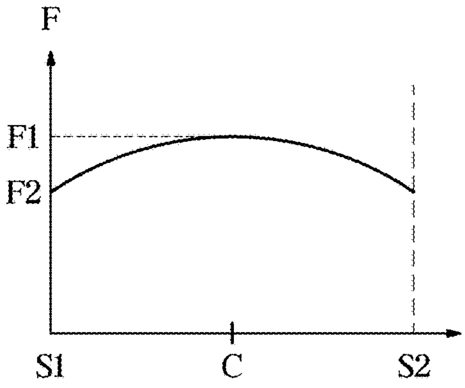
Figure 9D:
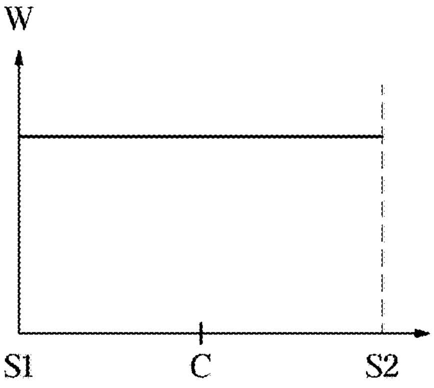

FIG. 8 is a partially enlarged view of parts A and B of FIG. 5 according to a third embodiment of the present disclosure. Further, FIG. 9(*b*) is a graph for depicting a backlash B with respect to the position of the threaded part 120, FIG. 9(*c*) is a graph for depicting a frictional force F for the ball nut 170 or the ball 160 with respect to the position of the threaded part 120, and FIG. 9(*d*) is a graph for depicting the weight sensitivity W (reaction force) of the steering wheel.

Referring to FIGS. 5, 8, and 9, the threaded part 120 of the steering rack 100 according to the third embodiment of the present disclosure may be divided into the first area relatively adjacent to or at the center C and the second area relatively adjacent to or at both ends S1 and S2 of the threaded part 120. A backlash B1 of the first area of the threaded part 120 may be provided to be different from a backlash B2 of the second area of the threaded part 120.

In detail, the backlash B1 of the screw gear teeth 121 in the first area of the threaded part 120 may be provided to be relatively smaller than the backlash B2 of the screw gear teeth 121 in the second area of the threaded part 120. That is, the backlash B1 of the screw gear teeth 121 adjacent to or at the center C of the threaded part 120 may be provided to be smaller than the backlash B2 of the screw gear teeth 121 adjacent to or at both ends S1 and S2 of the threaded part 120, and accordingly, the frictional force F1 between the screw gear teeth 121 adjacent to or at the center C of the threaded part 120 and the ball nut 170 may be implemented to be greater than the frictional force F2 between the screw gear teeth 121 adjacent to or at both ends S1 and S2 of the threaded part 120 and the ball nut 170.

Furthermore, the screw gear teeth 121 of the threaded part 120 may be provided such that the backlash B of the screw gear teeth 121 may be gradually or progressively changed from both ends S1 and S2 of the threaded part 120 to the center C of the threaded part 120 with respect to the longitudinal direction of the threaded part 120 without distinction by a certain area. The backlash B1 of the screw gear teeth 121 relatively adjacent to or at the center C of the threaded part 120 is provided to be smaller than the backlash B2 of the screw gear teeth 121 relatively adjacent to or at the side portions S1 and S2 of the threaded part 120 so that the backlash B may gradually or progressively increase from both ends S1 and S2 toward the center C of the threaded part 120. Therefore, the frictional force F1 between the screw gear teeth 121 and the ball nut 170 at the center C of the threaded part 120 is formed to be greater than the frictional force F2 between the screw gear teeth 121 and the ball nut 170 at both ends S1 and S2 of the threaded part 120, and the magnitude of the frictional force F may gradually increase toward the center C of the threaded part 120.

Accordingly, as illustrated in FIG. 9(*d*), even in a state in which the steering wheel or the wheels are steered to a left end or a right end, the weight sensitivity or steering sensitivity W of the steering wheel, which is felt by the driver, can be constant, and a state in which the wheels are arranged in the front-rear direction of the vehicle body can be stably maintained when the vehicle is driving straight.

Meanwhile, in some embodiments of the present disclosure, the weight sensitivity or the steering sensitivity of the steering wheel may be kept constant regardless of the steering angle of the steering wheel or the wheels. However, the present disclosure is not limited thereto. For instance, when the weight sensitivity of the steering wheel at a specific steering angle is biased according to an operational environment of the vehicle or an individual tendency of the driver, even when the backlash B of the screw gear teeth 121 at the corresponding steering angle intentionally decreases, this case may be equally understood as the same technical spirit.

Hereinafter, a method for manufacturing the steering rack 100 according to an embodiment of the present disclosure will be described.

Figure 10A:
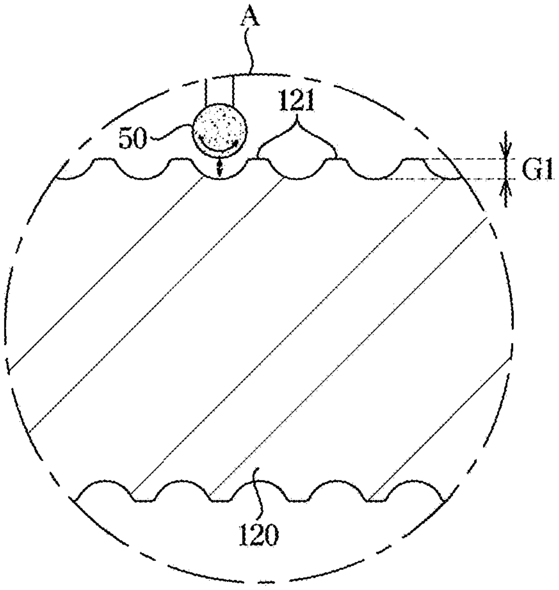
FIG. 10(*a*) is a partially enlarged cross-sectional view of part A of FIG. 5 showing screw gear teeth formed with a first processing depth according to an embodiment of the present disclosure, and FIG. 10(*b*) is a partially enlarged cross-sectional view of part B of FIG. 5 showing screw gear teeth formed with a second processing depth according to an embodiment of the present disclosure for illustrating a method of manufacturing a steering rack.
Figure 10B:
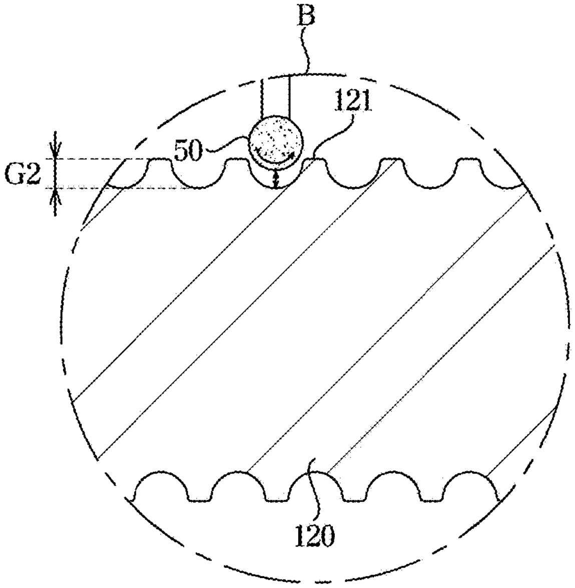

FIG. 10 is a partially enlarged view for illustrating a method for manufacturing the steering rack 100 according to an embodiment of the present disclosure. FIG. 10(*a*) is a partially enlarged cross-sectional view of part A of FIG. 5 showing the screw gear teeth 121 formed with a first processing depth G1, and FIG. 10(*b*) is a partially enlarged cross-sectional view of part B of FIG. 5 showing the screw gear teeth 121 formed with a second processing depth G2.

Referring to FIG. 10, the method of manufacturing the steering rack 100 according to the embodiment of the present disclosure may include preparing the body part 110 of the steering rack 100 and forming the threaded part 120 on one side of the body part 110. The step of forming of the threaded part 120 may include forming the screw gear teeth 121 engageable with the ball nut 170.

The step of forming of the screw gear teeth 121 may include processing the first area of the threaded part 120 relatively adjacent to or at the center C of the threaded part 120 with respect to the longitudinal direction of the threaded part 120, and processing the second area relatively adjacent to or at both ends S1 and S2 of the threaded part 120. In this case, in the step of processing of the first area and the second area of the threaded part 120, the processing depth G1 of the first area on the outer circumferential surface of the body part 110 may be different from the processing depth G2 of the second area on the outer circumferential surface of the body part 110.

For example, when the screw gear teeth 121 of the threaded part 120 is processed or machined and formed, the gear teeth 121 may be formed by cutting a rotating grinding stone 50 inwards. Accordingly, each the processing of the first area of the threaded part 120 and the processing of the second area of the threaded part 120 may include cutting the grinding stone 50 inward from the outer circumferential surface of the body part 110 toward an axis of the body part 110. Further, the grinding stone 50 may be cut in the first processing depth G1 during the step of processing of the first area of the threaded part 120, and the grinding stone 50 may be cut in the second processing depth G2, which is different from the first processing depth G1, during the step of processing of the second area of the threaded part 120 so that the processing depth G1 of the first area of the threaded part 120 and the processing depth G2 of the second area of the threaded part 120 may be different from each other.

The first processing depth G1 of the screw gear teeth 121 in the first area of the threaded part 120 may be provided to be relatively smaller than the second processing depth G2 of the screw gear teeth 121 in the second area of the threaded part 120. That is, the processing of the screw gear teeth 121 may be performed such that the second processing depth G2 of the screw gear teeth 121 adjacent to or at both ends S1 and S2 of the threaded part 120 may be provided to be greater than the first processing depth G1 of the screw gear teeth 121 adjacent to or at the center C of the threaded part 120. Accordingly, like the steering rack 100 according to the first embodiment of the present disclosure, the over ball diameter OBD1 of the screw gear teeth 121 in the first area adjacent to or at the center C1 of the threaded part 120 may be formed to be greater than the over ball diameter OBD2 of the screw gear teeth 121 in the second area relatively adjacent to or at both ends or sides S1 and S2 of the threaded part 120. Further, like the steering rack 100 according to the third embodiment of the present disclosure, the backlash B1 of the screw gear teeth 121 in the first area adjacent to or at the center C1 of the threaded part 120 may be formed to be smaller than the backlash B2 of the screw gear teeth 121 in the second area relatively adjacent to or at both ends or sides S1 and S2 of the threaded part 120. Accordingly, the frictional force F1 between the screw gear teeth 121 adjacent to or at the center C of the threaded part 120 and the ball nut 170 may be implemented to be greater than the frictional force F2 between the screw gear teeth 121 adjacent to or at both ends S1 and C of the threaded part 120 and the ball nut 170.

Furthermore, in the step of forming of the screw gear teeth 121, the processing of the screw gear teeth 121 may be performed such that the processing depth Gin the outer circumferential surface of the body part 110 is gradually or progressively changed from both ends S1 and S2 of the threaded portion 120 toward the center C of the threaded portion 120 with respect to the longitudinal direction of the threaded part 120 without distinction by a certain area. As the processing of the screw gear teeth 121 is performed such that the cutting length G of the grinding stone 50 gradually decreases from both ends S1 and S2 of the threaded portion 120 to the center C of the threaded part 120, the processing depth G of the screw gear teeth 121 relatively adjacent to or at the center C of the threaded portion 120 may be smaller than the processing depth G of the screw gear teeth 121 relatively adjacent to or at the side portions S1 and S2 of the threaded portion 120, and the processing depth G may gradually or progressively decrease from both ends S1 and S2 of the threaded portion 120 toward the center C of the threaded part 120. Therefore, the frictional force F1 between the screw gear teeth 121 and the ball nut 170 in the center C of the threaded part 120 may be formed to be greater than the frictional force F2 between the screw gear teeth 121 and the ball nut 170 in both ends S1 and S2 of the threaded part 120, and the magnitude of the frictional force F may gradually increase toward the center C of the threaded portion 120.

Hereinafter, a method of manufacturing the steering rack 100 according to another embodiment of the present disclosure will be described.

Figure 11A:
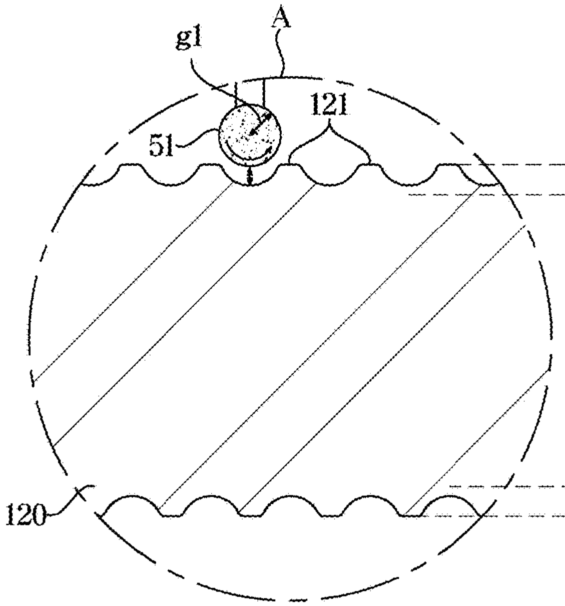
FIG. 11(*a*) is a partially enlarged cross-sectional view of part A of FIG. 5 illustrating screw gear teeth formed by applying a first grinding stone having a radius, and FIG. 11(*b*) is a partially enlarged cross-sectional view of part B of FIG. 5 illustrating screw gear teeth formed by applying a second grinding stone having a different radius for illustrating a method of manufacturing a steering rack according to another embodiment of the present disclosure.
Figure 11B:
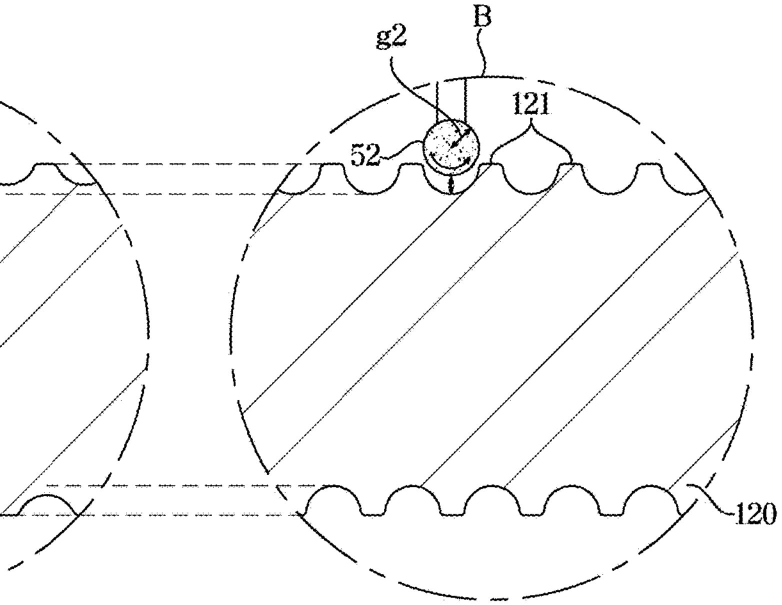

FIG. 11 is a partially enlarged view for illustrating a method for manufacturing the steering rack 100 according to another embodiment of the present disclosure. FIG. 11(*a*) is a partially enlarged cross-sectional view of part A of FIG. 5 illustrating the screw gear teeth 121 formed by applying a first grinding stone 51 having a radius, and FIG. 11(*b*) is a partially enlarged cross-sectional view of part B of FIG. 5 illustrating the screw gear teeth 121 formed by applying a second grinding stone 52 having a different radius from the first grinding stone 51.

Referring to FIG. 11, the method of manufacturing the steering rack 100 according to another embodiment of the present disclosure may include preparing the body part 110 of the steering rack 100 and forming the threaded part 120 on one side of the body part 110. The step of forming of the threaded part 120 may include forming the screw gear teeth 121 engageable with the ball nut 170.

In the step of forming of the screw gear teeth 121, the gear teeth may be formed by applying a plurality of grinding stones 51 and 52 having different radii g1 and g2, respectively, according to the positions of the screw gear teeth 121. In detail, in the step of forming of the screw gear teeth 121, the gear teeth may be processed or machined and formed while the radii g1 and g2 of the applied grinding stones 51 and 52 from both ends S1 and S2 of the threaded part 120 toward the center C of the threaded part 120 gradually change. For example, the gear teeth 121 may be processed and formed while the radii g1 and g2 of the applied grinding stones 51 and 52 gradually or progressively increase from both ends 51 and S2 of the threaded part 120 toward the center C of the threaded part 120. A single gear tooth has the same pitch. Thus, as the radius g1 of the grinding stone 51 becomes greater, the processing depth of the gear teeth 121 or the cutting length of the grinding stone 51 becomes smaller, and in contrast, as the radius g2 of the grinding stone 52 becomes smaller, the processing depth of the gear teeth 121 or the cutting length of the grinding stone 52 becomes greater. Accordingly, like the steering rack 100 according to the second embodiment of the present disclosure, the thread groove curvature radius D1 of the screw gear teeth 121 adjacent to or at the center C of the threaded part 120 may be provided to be greater than the thread groove curvature radius D2 of the screw gear teeth 121 relatively adjacent to or at the side portions S1 and S2 of the threaded part 120. Therefore, like the steering rack 100 according to the first embodiment of the present disclosure, the over ball diameter OBD1 of the screw gear teeth 121 adjacent to or at the center C of the threaded part 120 may be formed to be greater than the over ball diameter OBD2 of the screw gear teeth 121 adjacent to or at both ends S1 and S2 of the threaded part 120. Accordingly, the frictional force F1 between the screw gear teeth 121 adjacent to or at the center C of the threaded part 120 and the ball nut 170 may be implemented to be greater than the frictional force F2 between the screw gear teeth 121 adjacent to or at both ends S1 and S2 of the threaded part 120 and the ball nut 170, and the magnitude of the frictional force F may gradually increase toward the center C of the threaded part 120.

The steering rack 100 and the method for manufacturing the same according to some embodiments of the present disclosure may have a simple structure and a simple manufacturing process comparing with conventional technology. The over ball diameter OBD of the screw gear teeth 121 on the threaded part 120 of the steering rack 100, the thread groove curvature radius D on the same pitch, and the backlash B of the screw gear teeth 121 may be differently or gradually changed according to a relative position of the threaded part 120. Further, the frictional force F between the screw gear teeth 121 and the ball nut 170 (or the ball) may increase toward the center C of the threaded part 120. Therefore, the weight sensitivity or steering sensitivity W felt by the driver from the steering wheel can be constant regardless of the steering angle of the steering wheel or the wheels. Furthermore, since the fixing force of the wheels may be constant regardless of the steering angle of the wheels, the driving stability of the vehicle, particularly, straight high-speed stability of the vehicle, can be improved.

As is apparent from the above description, in a steering rack and a method of manufacturing the same according to certain embodiments of the present disclosure, a stable steering sensitivity can be provided to a driver.

In a steering rack and a method for manufacturing the same according to some embodiments of the present disclosure, driving stability and high-speed stability of a vehicle can be improved.

In a steering rack and a method for manufacturing the same according to certain embodiments of the present disclosure, the driver can receive a constant reaction force or a constant weight sensitivity of a steering wheel, which is felt during steering.

In a steering rack and a method for manufacturing the same according to some embodiments of the present disclosure, a uniform steering sensitivity can be transferred to the driver regardless of a steering state of the wheels or a driving speed of the vehicle.

In a steering rack and a method for manufacturing the same according to certain embodiments of the present disclosure, efficiency and productivity of a manufacturing process can be improved through a simple structure.

In a steering rack and a method for manufacturing the same according to some embodiments of the present embodiment, product competitiveness can be promoted by suppressing an increase in a manufacturing cost.

What is claimed is:

1. A steering rack comprising:

a body part having ends, each end of the body part of the steering rack connectable to a respective wheel; and a threaded part provided on the body part of the steering rack and having screw gear teeth configured to be engageable with a ball nut configured to be rotatable by a motor, wherein an over ball diameter of a first area of the screw gear teeth positioned relatively adjacent to a center of the threaded part of the steering rack is greater than an over ball diameter of a second area of the screw gear teeth positioned relatively adjacent to ends of the threaded part of the steering rack.

2. The steering rack of claim 1, wherein an over ball diameter of the screw gear teeth of the steering rack gradually changes from the ends of the threaded part of the steering rack to the center of the threaded part of the steering rack.

3. The steering rack of claim 2, wherein the over ball diameter of the screw gear teeth of the steering rack gradually increases from the ends of the threaded part of the steering rack to the center of the threaded part of the steering rack.

4. The steering rack of claim 1, wherein a frictional force between the screw gear teeth and the ball nut in the first area is greater than a frictional force between the screw gear teeth and the ball nut in the second area.

5. The steering rack of claim 3, wherein a frictional force between the screw gear teeth and the ball nut gradually increases from the ends of the threaded part of the steering rack to the center of the threaded part of the steering rack.

* * * * *